(12) United States Patent
Hangleiter

(10) Patent No.: US 8,403,338 B2
(45) Date of Patent: Mar. 26, 2013

(54) DEVICE USABLE AS GRIPPER HEAD OR CHUCK

(75) Inventor: Eugen Hangleiter, Hermaringen (DE)

(73) Assignee: ROEHM GmbH, Sontheim (DE)

( * ) Notice: Subject to any disclaimer, the term of this patent is extended or adjusted under 35 U.S.C. 154(b) by 965 days.

(21) Appl. No.: 12/436,496

(22) Filed: May 6, 2009

(65) Prior Publication Data
US 2009/0278323 A1 Nov. 12, 2009

(30) Foreign Application Priority Data
May 7, 2008 (DE) .......................... 10 2008 022 826

(51) Int. Cl.
*B23B 31/103* (2006.01)
(52) U.S. Cl. .......... 279/37; 279/35; 279/46.1; 279/46.9; 279/50; 409/233
(58) Field of Classification Search .............. 279/37, 279/35, 50, 46.1, 46.9; 409/232–234; *B23B 31/103*
See application file for complete search history.

(56) References Cited

U.S. PATENT DOCUMENTS

| | | | |
|---|---|---|---|
| 5,746,436 A * | 5/1998 | Kulan et al. ................... 279/4.04 |
| 5,820,136 A * | 10/1998 | Han et al. ....................... 279/131 |
| 5,860,776 A * | 1/1999 | Sato et al. ...................... 409/233 |
| 6,419,430 B2 * | 7/2002 | Hangleiter ..................... 409/233 |
| 6,481,940 B2 * | 11/2002 | Prust et al. .................... 409/233 |
| 6,568,888 B2 * | 5/2003 | Hangleiter ..................... 409/233 |
| 6,601,857 B1 * | 8/2003 | Richmond ........................ 279/20 |
| 6,616,149 B1 * | 9/2003 | Pjevach et al. ................... 279/75 |
| 7,195,431 B2 * | 3/2007 | Greif et al. ..................... 409/233 |
| 7,367,762 B2 * | 5/2008 | Takase et al. .................. 409/233 |
| 2001/0006280 A1 * | 7/2001 | Hangleiter ....................... 279/37 |
| 2002/0053770 A1 * | 5/2002 | Hangleiter .................... 279/2.02 |
| 2005/0220556 A1 * | 10/2005 | Takase et al. ................. 409/233 |
| 2006/0002778 A1 * | 1/2006 | Hangleiter ..................... 409/233 |

* cited by examiner

*Primary Examiner* — Eric A Gates
*Assistant Examiner* — Bayan Salone
(74) *Attorney, Agent, or Firm* — Andrew Wilford

(57) ABSTRACT

A device for clamping a stem has a body forming a piston chamber and having an axially outwardly open hole adapted to receive the stem and a plurality of collet jaws in the hole shiftable axially by a piston between an outer releasing position with its axial outer ends radially spread and an inner holding position with the ends more closely radially juxtaposed. The stem is engageable axially in the hole between the jaws and lockable in the body in the inner holding position. A main spring urges the piston and jaws axially inward into the inner position. A cover element has an outer head and is axially shiftable relative to the piston between an extended position with the head engaged radially between the outer ends of the jaws and a retracted position with the head spaced axially inward from the outer ends of the jaws.

10 Claims, 3 Drawing Sheets

DEVICE USABLE AS GRIPPER HEAD OR CHUCK

FIELD OF THE INVENTION

The invention relates to a device for clamping a stem. More particularly this invention concerns a chuck or gripper head with a body forming a piston chamber, a release piston in the chamber acting on an actuating member, at least one tension spring in a spring compartment acting on the release piston, and a collet chuck in a tool hole actuatable by the actuating member and having at least two collet jaws.

BACKGROUND OF THE INVENTION

A device of this type known in practice is used in particular for locking down pallets. In such securing of pallets a draw-down bolt on the lower side of the pallet fits between the jaws of the collet chuck to secure the pallet, to which end the collet chuck must be held in the open position by the release piston, which necessitates a corresponding application of pressure on the release piston in the piston chamber. When the draw-down bolt engages between the jaws, the tension must be positively activated by switching off the release pressure, so that the tension spring can shift the release piston with the actuating member and thus close the collet chuck.

OBJECTS OF THE INVENTION

It is therefore an object of the present invention to provide an improved device usable as a chuck or gripper head.

Another object is the provision of such an improved chuck or gripper head that overcomes the above-given disadvantages, in particular that needs to be pressurized or depressurized only to release the tool or stem being held, but that can reclamp or regrip automatically if a stem is inserted into it.

SUMMARY OF THE INVENTION

A device for clamping a stem has according to the invention a body forming a piston chamber, extending along an axis, and having an axially outwardly open hole adapted to receive the stem and a plurality of collet jaws in the hole having axially outer ends and shiftable axially between an outer releasing position with the ends radially spread and an inner holding position with the ends more closely radially juxtaposed. The stem is engageable axially in the hole between the jaws and lockable in the body in the inner holding position. A piston axially shiftable in the chamber is coupled to the jaws for shifting same between the outer and inner positions. A main spring urges the piston and jaws axially inward into the inner position. A cover element has an outer head and is axially shiftable relative to the piston between an extended position with the head engaged radially between the outer ends of the jaws and a retracted position with the head spaced axially inward from the outer ends of the jaws. The head is dimensioned such that in the extended position it blocks radial inward movement of the outer ends of the jaws from the releasing position to the holding position. A secondary spring braced between the cover element and the piston and urging the element into the extended position.

This design according to the invention of the device results in the advantage that by means of the head of the cover the jaws are held open for insertion of the draw-in bolt, no actuation of the release piston being necessary to this end, which is actually now needed only for releasing, so that pressurization is also necessary only when the device, mounted for example rule on a drive screw of a machine tool, is at rest. Transfer of the pressure medium into a rotating component during operation is therefore not necessary, so that in this respect a simplification of the sealing requirements also results.

It has furthermore proven to be advantageous if the cover head has a tubular rod on its inner side extending away from the tool, in which tubular rod the spring is received so that the spring can be bear in a simple manner against the component on which the cover is supported without thereby obstructing operation of the collet chuck or interfering with positioning of the draw-down bolt.

It has furthermore proven to be advantageous when the cover head is cylindrical and has an outer surface for the jaws, since with this design during insertion of the draw-down bolt the jaws can easily slide along the cylindrical side surface and along a ridge or collar of the draw-down bolt until the jaws engage outward around the stud collar.

The tool hole has a seal ring with a central hole on the side facing toward the tool, which central hole in the release position is closed by the cover head having an end face for the tool prevents entry of dirt. Furthermore, this makes it possible to evaluate the back pressure of the cleaning and blowing air in order thus to obtain information about the closed position and to utilize this information in the machine control.

In principle it is possible to mount the spring between the cover and the actuating member or the release piston, where considerable space is available for installation if the spring is supported on a piston collar of the release piston.

The body has around the hole a frustoconical shape so that centering takes place at the same time through the clamping process during placement of the draw-in bolt between the jaws of the collet chuck.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
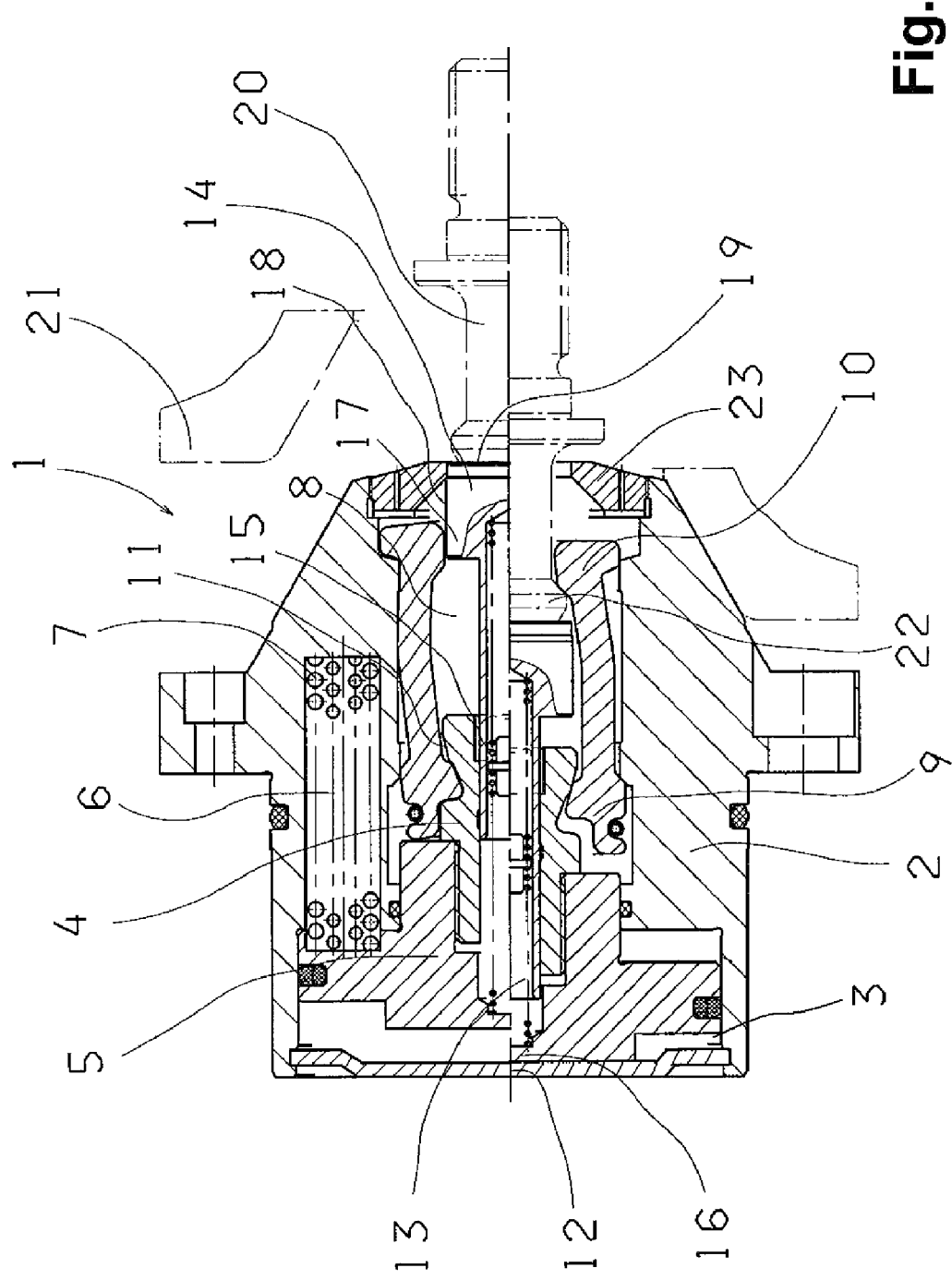
FIG. 1 is a longitudinal section through a device according to the invention, shown in the upper half in the open position, in the lower half in the closed position.

As seen in FIG. 1 a device 1 has a chuck body 2 forming with an end plate 26 a chamber 3 behind a release piston 5 to which is axially fixed an actuating member 4. Furthermore, a compression spring 7 in a compartment 6 bears is braced axially between the release piston 5 and the body 2 to urge the piston 5 inward. The body 2 is centered on an axis 12.

Figure 2:
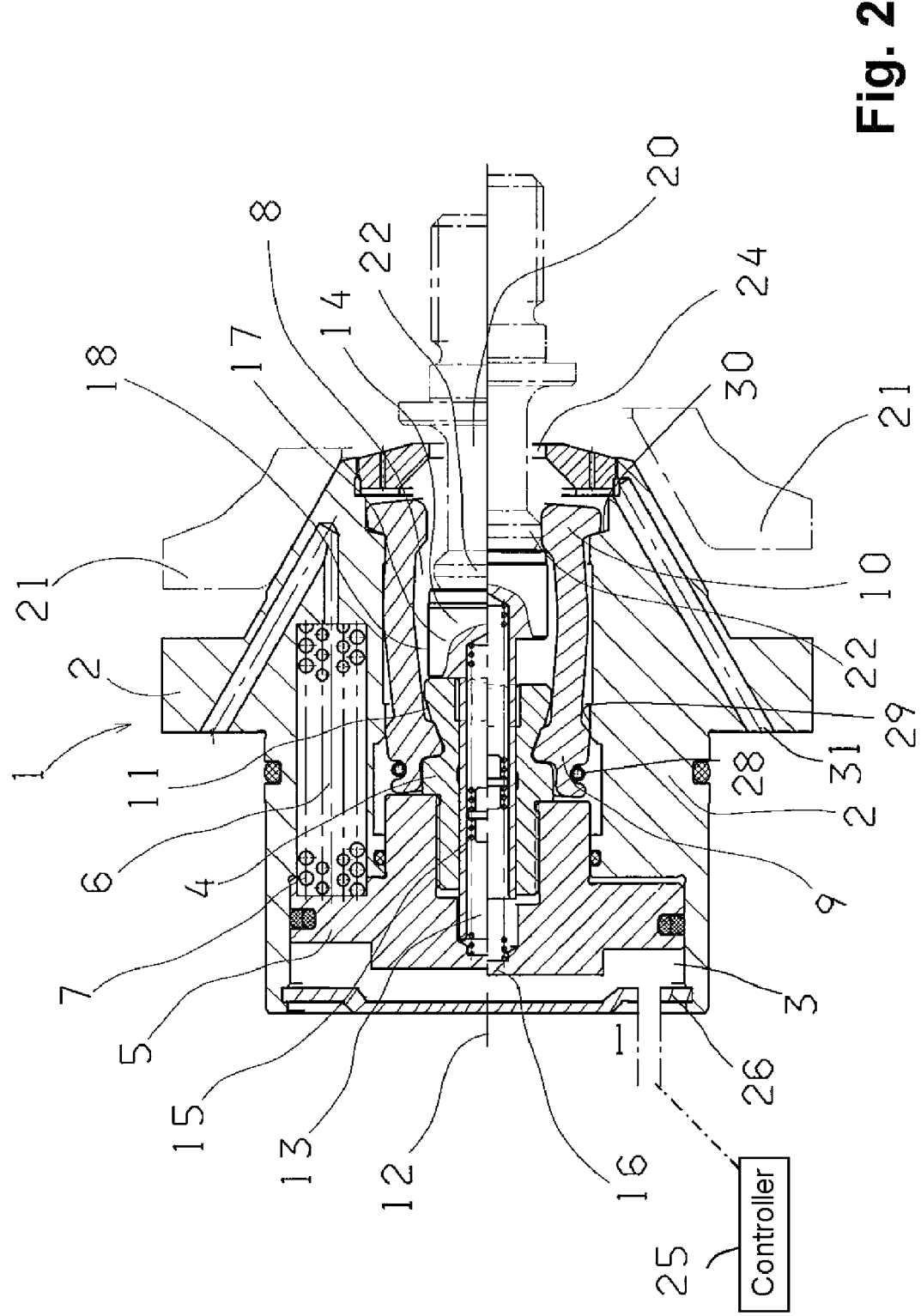
FIG. 2 is a longitudinal section through a device according to the invention, shown in the upper half in the open position for removing the draw-down bolt, in the lower position during insertion of the draw-down bolt.
Figure 3:
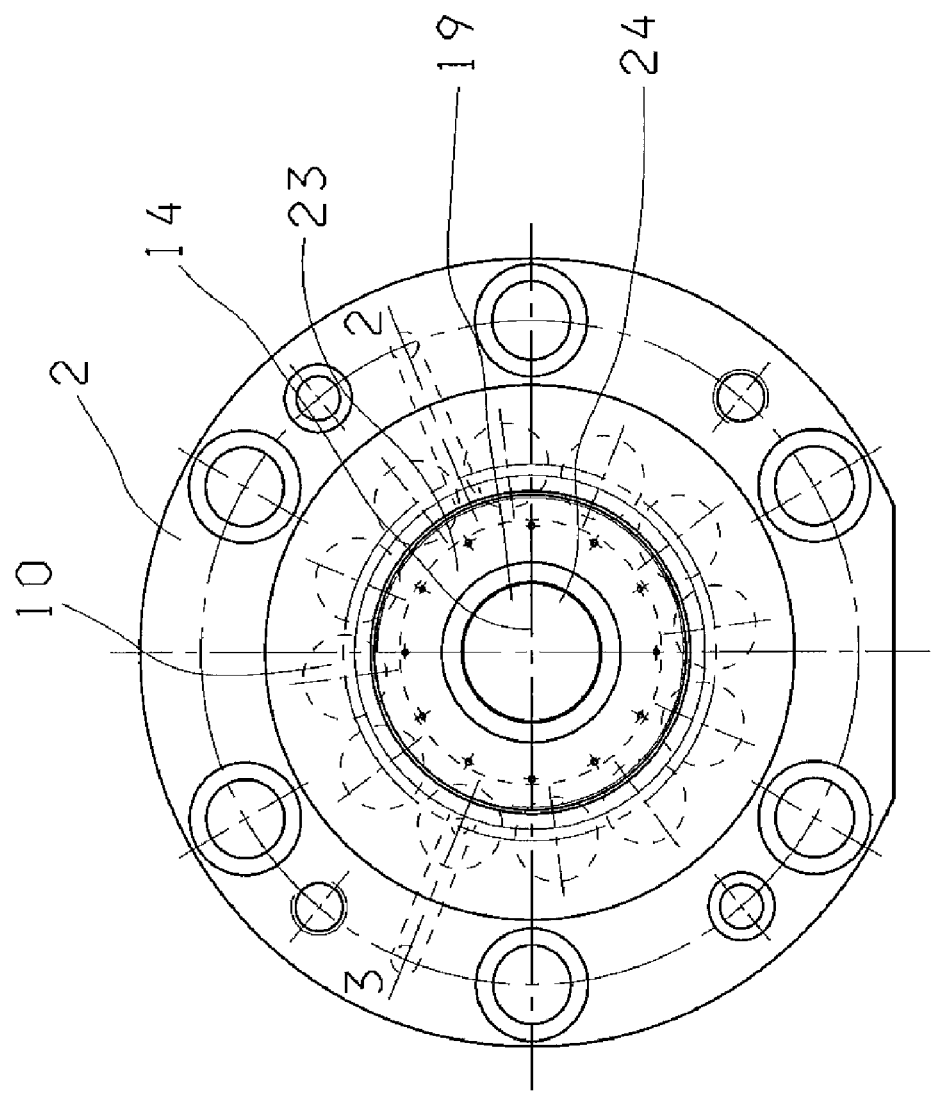
FIG. 3 is a front view of the device according to the invention.

A collet chuck 9 in a tool hole 8 of the body 2 is operable by the actuating member 4 and has at least two collet jaws 10. As is standard, the actuating member 4 has a frustoconical control surface 11 that acts on inner faces of inner axial ends of the jaws 10 in order to pivot them between an open position in which outer ends of the jaws 10 are shifted radially outward, and a closed position in which these outer ends grip a stem 20, which can be the shaft of a tool or a post of a shipping container or pallet 21. A spring 28 continuously urges the inner ends of the jaws 10 inward against the actuating member 4. The hole 8 has a small-diameter portion 29 that, when the member 4 and jaws 10 are pushed axially outward (to the right in FIGS. 1 and 2) engages these inner jaw ends and, as shown in FIG. 2 on the top, pivots out their outer ends. In this advanced position axially inwardly directed faces of the outer ends bear axially an axially outwardly directed shoulder 30 formed in the hole 8. The piston 5 is axially fixed to the member 4 that is axially coupled to the jaws 10, although as shown in the bottom of FIG. 1, limited relative axial movement is possible between the jaws 10 and the member 4.

According to the invention a closure or cover 14 is supported in an axially displaceable manner in a guide passage 13 of the actuating member 4 coaxial to the axis 12 of the body 2 and is acted on by a spring 15 indirectly or directly braced against the actuating member 4. Here the spring 15 bears axially inwardly on a collar 16 of the release piston 5 that is connected to the actuating member 4 and axially outwardly on the cover 14. The cover 14 has a cylindrical head 17 having a cylindrical outer side surface 18 for the jaws 10 and a planar outer-end abutment face 19 for the stem 20.

The hole 8 has on its outer end a seal ring 23 with a central hole 24 into which the head 17 of the cover 14 is a snug fit, with the planar end face 19 flush with the planar outer face of the ring 23. The body 2 itself has an outer end shaped like a cone in order to increase its special suitability for pallet clamping, since this shape assists automatic centering during the placement of the complementarily shaped seat of the pallet.

The stem 20 itself is formed at its inner end with a radially outwardly projecting locking ridge 22 of a diameter that is slightly less than that of the head 18 so that it can fit easily through the hole 24. In the clamped position (FIG. 1 bottom) the outer ends of the jaws 10 bear tightly radially inwardly against the frustoconical outer face off this ridge 22. The inner face of this ridge 22 is similarly frustoconical but axially inwardly tapered. A passage 31 in the body 2 allows air under pressure to be blown into the front end of the hole 1 to clear it, escaping through small passages formed in the ring 23 around the hole 24. The back pressure of the air thus fed in will accurately indicate whether the head 18 is in the outer extended position or not.

Thus during normal operation with the stem 20 locked in the device 1 as shown in the bottom half of FIG. 1, the chamber 3 is at atmospheric pressure and the spring 7 is holding the piston 5 at the inward (to the left in FIG. 1) end of its axial travel. This action also pulls the jaws 10 axially inward while camming out their inner ends and pivoting in their outer ends, bringing these outer ends into locking engagement outward of the locking ridge 22 on the stem 20. The stem 20 is therefore locked in the device 1 and the device is completely stable, with no outside forces needed to maintain it in this position.

To release the stem 20, the chamber 3 is pressurized by a system controller 25. As shown in the top half of FIG. 1 this action pushes the piston 5 outward (to the right in FIG. 1) and compresses the spring 7. It also pushes the jaws 10 axially outward while camming in their inner ends with the smaller-diameter region 29 of the hole 8 and allowing their outer ends to pivot radially outward and lock behind the axially outwardly directed shoulder 30 of the hole 8. In this position the stem 20 is clear of the jaws 10 and can be pulled axially out of the hole 8. At the same time, the weak spring 15 will push the cover/plug 14 axially out behind the exiting stem 20 and its head 17 will come to rest blocking the hole 24 in the ring 23 and engaging outward with its surface 18 on the inner faces of the outer ends of the jaws 10.

If then the chamber 3 is allowed to return to ambient pressure, the spring 7 try to push the piston 3 inward (to the left in FIG. 1), but this piston 3 will be unable to move since it is axially linked through the member 4 to the jaws 10 whose outer ends bear axially inward on the shoulder 30 and are thus axially locked to the body 2. These jaws 10 cannot pivot radially inward because the surface 18 of the head 17 is blocking such movement. The force of the spring 7 urging the piston 5 inward is simply translated into a force pressing the axial outer ends of the jaws 10 radially inward against the surface 18, but the jaws 10 remain axially locked to the body 2. Thus, with no outside influence on the device 1, in particular no pressurization or depressurization, it will remain in the open position with the hole 24 in the ring 23 plugged and the outer jaw ends spread, basically indefinitely.

In this position as shown in FIG. 2, if a stem 20 is pressed against the end face 19 of the head 17 and pushed inward, the head 17 will move axially inward as shown on the upper half of FIG. 2 and, once it slides back off the inner faces of the outer ends of the jaws 10, these outer faces will come to rest on the ridge 22 as shown in the bottom half of FIG. 2. Then when the collar 22 moves inward past outer the outer ends of the jaws 10 as shown in the top half of FIG. 2, the outer ends of these jaws 10 will be able to swing radially inward, move off the shoulder 30, and grip the stem 20 outward of the collar 22. The spring 7 will be able to shift the piston 5, member 4 and jaws 10 axially inward, pulling in the stem 20 and locking it in the device 1. The system is returned to the position of the bottom half of FIG. 1.

Thus with this system it is only necessary to pressurize the chamber 3 briefly while the stem 20, here shown as a pallet bolt but that could also be a shaft of a tool, is pulled out. Once it is out the inventive cover 14 maintains the jaws 10 spread while also blocking the hole 24.

I claim:
1. A device for clamping a stem, the device comprising:
a body forming a piston chamber, extending along an axis, and having an axially outwardly open hole adapted to receive the stem;
a plurality of collet jaws in the hole having axially outer ends and shiftable axially between an outer releasing position with the ends radially spread and an inner holding position with the ends more closely radially juxtaposed, the stem being engageable axially in the hole between the jaws and lockable in the body in the inner holding position;
a piston axially shiftable in the chamber and coupled to the jaws for shifting same between the outer and inner positions, the chamber being oriented relative to the piston such that pressurization of the chamber moves the piston axially outward;
a main spring urging the piston axially inward and thereby urging the jaws into the inner holding position;
a cover element having an outer head and axially shiftable relative to the piston between an extended position with the head engaged radially between the outer ends of the jaws and a retracted position with the head spaced axially inward from the outer ends of the jaws, the head being dimensioned such that in the extended position it blocks radial inward movement of the outer ends of the jaws from the releasing position to the holding position; and
a secondary spring braced between the cover element and the piston and urging the element into the extended position, such that in the extended position of the cover element, insertion of the stem axially inward into the hole pushes the head of the cover element axially inward to allow the outer ends of the jaws to move radially inward and grip the stem.

2. The device defined in claim 1 wherein the main spring has a greater spring force than the secondary spring.

3. The device defined in claim 1 wherein the piston is formed with an axially centered and outwardly open guide passage and the cover element has an axially inwardly extending rod slidable in the passage, the secondary spring being in the passage.

4. The device defined in claim 3 wherein the rod is tubular and the secondary spring is at least partially inside the rod.

5. The device defined in claim 1 wherein the head has a cylindrical outer surface centered on the axis and radially outwardly engageable in the extended position with the outer ends of the jaws.

6. The device defined in claim 5 wherein the head has a flat outer face lying generally in a plane perpendicular to the axis and substantially flush with an outer face of the body in the extended position.

7. The device defined in claim 6 wherein the body includes a seal ring forming an outer end of the hole and the outer face of the body.

8. The device defined in claim 6 wherein the body is of outwardly tapered frustoconical shape around its outer face.

9. The device defined in claim 1 wherein the piston includes an actuating member axially fixed to the piston and provided with a cam formation acting on inner ends of the jaws.

10. The device defined in claim 9 wherein the piston is formed with a collar against which an inner end of the main spring is braced.

* * * * *